US011919133B2

(12) United States Patent
Frost et al.

(10) Patent No.: US 11,919,133 B2
(45) Date of Patent: Mar. 5, 2024

(54) QUICK-RELEASE CAPTIVE CLAMPING PIN SYSTEMS AND METHODS

(71) Applicant: Carr Lane Manufacturing Co., St. Louis, MO (US)

(72) Inventors: Colin Walker Frost, St. Louis, MO (US); Joshua Matthew Herschbach, Highland, IL (US); Michael William Viejo-Robles, Overland, MO (US); Nancy Jerrell Ruth Shepard, St. Peters, MO (US)

(73) Assignee: Carr Lane Manufacturing Co., St. Louis, MO (US)

( * ) Notice: Subject to any disclaimer, the term of this patent is extended or adjusted under 35 U.S.C. 154(b) by 0 days.

(21) Appl. No.: 17/860,398

(22) Filed: Jul. 8, 2022

(65) Prior Publication Data
US 2024/0009809 A1 Jan. 11, 2024

(51) Int. Cl.
*B25B 5/16* (2006.01)

(52) U.S. Cl.
CPC ...................... *B25B 5/16* (2013.01)

(58) Field of Classification Search
CPC .......... F16B 21/165; B25B 5/16; B25B 27/00
USPC .................................... 29/244–283
See application file for complete search history.

(56) References Cited

U.S. PATENT DOCUMENTS

| 2,761,484 A | 9/1956 | Sternick et al. |
| 2,851,079 A | 9/1958 | Heller |
| 2,898,797 A * | 8/1959 | Bronstein ............. F16B 21/165 74/543 |
| 3,052,148 A * | 9/1962 | Price ..................... F16B 21/165 411/348 |
| 3,101,641 A * | 8/1963 | Walker .................. F16B 21/165 411/348 |
| 3,425,473 A | 4/1969 | Knowlton |
| 3,437,119 A | 4/1969 | Dey |
| 3,509,618 A * | 5/1970 | Siler ...................... F16B 21/165 81/10 |
| 3,596,554 A * | 8/1971 | Low ...................... F16B 21/165 24/453 |
| 3,659,491 A | 5/1972 | Duffy et al. |
| 3,820,199 A | 6/1974 | Popper et al. |
| 4,132,145 A | 1/1979 | Becker |
| 5,017,068 A | 5/1991 | Cooksey |
| 5,080,269 A | 1/1992 | Larsson et al. |
| 5,498,183 A | 3/1996 | Riviera |
| 6,079,179 A | 6/2000 | Shoemaker, Jr. |
| 6,290,442 B1 | 9/2001 | Peterkort |

(Continued)

FOREIGN PATENT DOCUMENTS

CN 212297200 U 1/2021

OTHER PUBLICATIONS

International Search Report in PCT/US2023/027562, dated Nov. 3, 2023, 3 pages.

*Primary Examiner* — Brian D Keller
*Assistant Examiner* — Sidney D Full
(74) *Attorney, Agent, or Firm* — Lewis Rice LLC (57) ABSTRACT

A quick-release captive clamping pin that uses a ball-lock pin and an endcap assembly to provide a tooling assembly with both holding and clamping action with a quick-release function. The captive clamping pin may include an adjustable-length ball-lock pin inserted through the tool and workpiece, where the length adjustment is used to apply clamping force.

9 Claims, 7 Drawing Sheets

(56) References Cited

U.S. PATENT DOCUMENTS

| | | | |
|---|---|---|---|
| 7,082,664 B2 | 8/2006 | Powers et al. | |
| 8,291,654 B2 | 10/2012 | Botkin et al. | |
| 9,033,609 B2 * | 5/2015 | Baus | F16B 21/165 403/322.2 |
| 9,840,296 B2 | 12/2017 | Laurenzo | |
| 10,393,159 B2 | 8/2019 | Frost et al. | |
| 2009/0064488 A1 | 3/2009 | Davies | |
| 2010/0025559 A1 | 2/2010 | Rathbone et al. | |
| 2011/0008128 A1 | 1/2011 | Soltis et al. | |
| 2015/0369272 A1 | 12/2015 | Hohmann, Jr. | |
| 2018/0236591 A1 | 8/2018 | Heimann et al. | |
| 2018/0274573 A1 * | 9/2018 | Frost | F16B 5/0208 |
| 2019/0032689 A1 | 1/2019 | Beardmore et al. | |
| 2019/0331146 A1 | 10/2019 | Frost et al. | |

* cited by examiner

QUICK-RELEASE CAPTIVE CLAMPING PIN SYSTEMS AND METHODS

BACKGROUND OF THE INVENTION

Field of the Invention

This disclosure is related to the field of machine tooling. In particular, it relates to a ball-lock captive pin system and method.

Description of the Related Art

Manufacturing processes almost always require that a number of component parts to the finished product are separately constructed and then assembled into the final finished product. This basic process has been used for millennia to assemble a complex device from simple component pieces. Whether in woodworking, cabinetry, or metalworking, there is a need both to hold a workpiece in place and to hold multiple workpieces together. Additionally, particularly with machining operations, a workpiece may need to be held in place for machining at a very specific and precise position. It is well known in manufacturing that the quality of machining depends greatly on the precision of the operations, which in turn requires that the workpiece be positioned with respect to the machining equipment very precisely and within accepted manufacturing tolerances.

Figure 1:
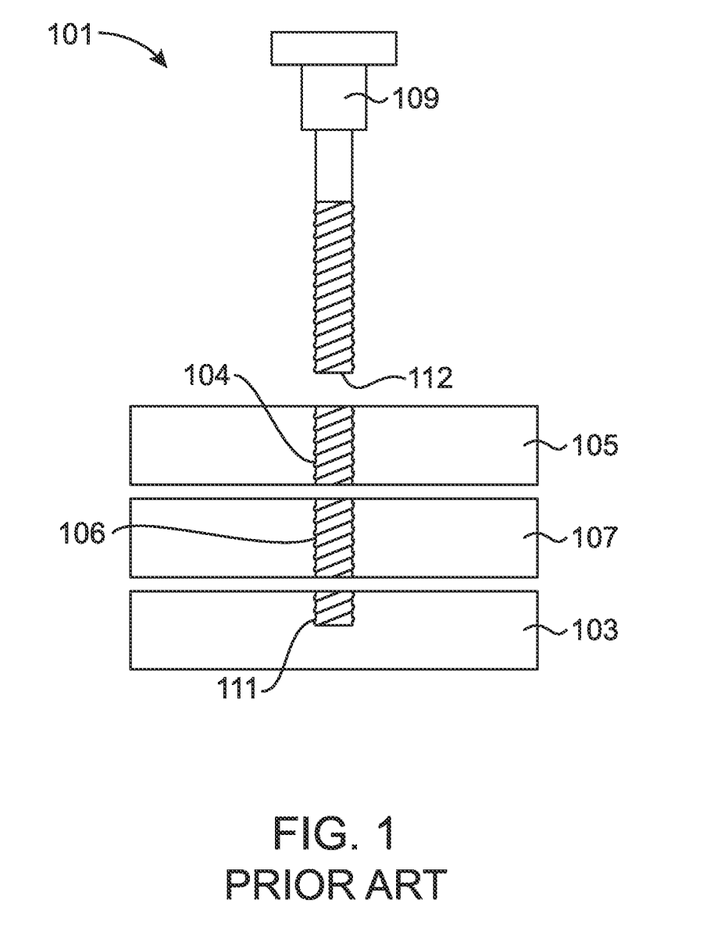
FIG. 1 is a prior art machine tooling assembly.

FIG. 1 depicts a prior art tooling assembly (101) for machining. In the depicted tooling assembly (101), a workpiece (107) is held in place between a top tooling element (105) and a bottom tooling element (103). The bottom tooling element (103) has a threaded receiver (111) to accept the distal end (112) of a threaded captive screw (109). The depicted tooling assembly (101) is assembled by inserting the distal end (112) through a threaded bore (104) or aperture (104) in the top tooling element (105), an aligned threaded bore (106) or aperture (106) in the workpiece (107), and is seated in the threaded receiver (111) in the bottom workpiece (103). By rotating the captive screw (109), clamping force is applied to the workpiece (107) by the top (105) and bottom (103) tooling elements via the threaded elements. However, this arrangement is laborious, time-consuming, and repetitive to setup and break down. Also, the repeated twisting motion can cause strain on the operator, and wear on the captive pin (109) threads can cause the connection to weaken over time.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for clamping a workpiece for machining comprising: providing a workpiece comprising a workpiece bore; providing a machine tool comprising a tool bore; providing a captive clamping pin assembly comprising: an adjustable-length ball-lock pin comprising: a tubular shaft having a plurality of ball apertures at a first end thereof, each of the ball apertures having a ball disposed therein; a plunger slidingly received in the tubular shaft; a handle assembly disposed at a second end opposing the first end; and a distance-adjusting means for adjusting a distance between the handle assembly and the first end by rotating the handle assembly; wherein the plunger is operable to a first position in which the plunger causes the balls to project through the plurality of apertures a distance greater than the outer radius of the shaft; and wherein the plunger is operable to a second position in which the balls recede inward of the outer radius; and a generally cylindrical endcap assembly having a first side and an opposing second side, and a bore extending generally coaxially therethrough; positioning the machine tool on a first side of the workpiece such that the tool bore and the workpiece bore are generally coaxially aligned; disposing the endcap assembly such that the tool bore, the workpiece bore, and the endcap assembly bore are generally coaxially aligned; receding the balls by moving the plunger to the second position; after the receding, inserting the first end of the shaft through the aligned tool bore, the workpiece bore, and the endcap assembly bore until the plurality of apertures are disposed beyond the endcap assembly second side; after the inserting, projecting the balls by moving the plunger to the first position; and rotating the handle assembly to cause the distance-adjusting means to shorten the distance between the handle assembly and the first end to a distance effective to cause the captive clamping pin assembly to apply clamping force to the workpiece and the machine tool.

In an embodiment, the method further comprises: providing a bushing assembly having an axial bore configured to receive the adjustable-length ball-lock pin; before the inserting, seating the bushing assembly in the tool bore such that the tool bore, the workpiece bore, the endcap assembly bore, and the axial bore are generally coaxially aligned; the inserting comprising inserting the first end of the shaft through the axial bore, the tool bore, the workpiece bore, and the endcap assembly bore.

In a further embodiment, the method comprises: in the providing a bushing assembly, the bushing assembly further comprising a locking means; after the seating the bushing assembly in the tool bore, locking the adjustable-length ball-lock pin to the bushing assembly with the locking means.

In a further embodiment, the locking means is a locking pin.

In a further embodiment the locking comprises locking the shaft to the bushing assembly.

In a further embodiment the disposing further comprises disposing the endcap assembly on a second side of the workpiece opposing the workpiece first side such that the endcap assembly first side is adjacent the workpiece second side.

In a further embodiment, the method comprises: providing a second machine tool comprising a second tool bore; disposing the second machine tool on the second side of the workpiece such that a first side of the second machine tool is adjacent the workpiece second side;

and disposing the endcap assembly on a second side of the workpiece such that the endcap assembly first side is adjacent a second side of the second machine tool opposing the first side.

In a further embodiment, the endcap assembly further comprises a lanyard pivotably attached to the endcap assembly.

In a further embodiment, the lanyard is pivotably attached to the adjustable-length ball-lock pin.

Also described herein, among other things, is a captive clamping pin assembly comprising: an adjustable-length ball-lock pin comprising: a tubular shaft having a plurality of ball apertures at a first end thereof, each of the ball apertures having a ball disposed therein; a plunger slidingly received in the tubular shaft; a handle assembly disposed at a second end opposing the first end; and a distance-adjusting means for adjusting a distance between the handle assembly and the first end by rotating the handle assembly; wherein the plunger is operable to a first position in which the plunger causes the balls to project through the plurality of apertures a distance greater than the outer radius of the shaft; and wherein the plunger is operable to a second position in which the balls recede inward of the outer radius; and a generally cylindrical endcap assembly having a first side and an opposing second side, and a bore extending generally coaxially therethrough.

Also described herein, among other things, is a captive clamping system including the captive clamping pin assembly and further comprising a workpiece comprising a workpiece bore.

In an embodiment, the captive clamping system further comprises a machine tool comprising a tool bore.

In an embodiment, the machine tool is positioned on a first side of the workpiece such that the tool bore and the workpiece bore are generally coaxially aligned.

In an embodiment, the endcap assembly is disposed on a second side of the workpiece opposing the workpiece first side such that the tool bore, the workpiece bore, and the endcap assembly bore are generally coaxially aligned.

In an embodiment, the first end of the shaft is inserted through the aligned tool bore, the workpiece bore, and the endcap assembly bore until the plurality of apertures are disposed beyond the endcap assembly second side.

In an embodiment, the captive clamping system further comprises a second machine tool comprising a second tool bore.

In an embodiment, the second machine tool is disposed on the second side of the workpiece such that a first side of the second machine tool is adjacent the workpiece second side and the endcap assembly is adjacent a second side of the second machine tool opposing the first side.

In an embodiment, the endcap assembly further comprises a lanyard pivotably attached to the endcap assembly.

In an embodiment, the lanyard is pivotably attached to the adjustable-length ball-lock pin. In an embodiment, the bushing assembly further comprising a locking means.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 2:
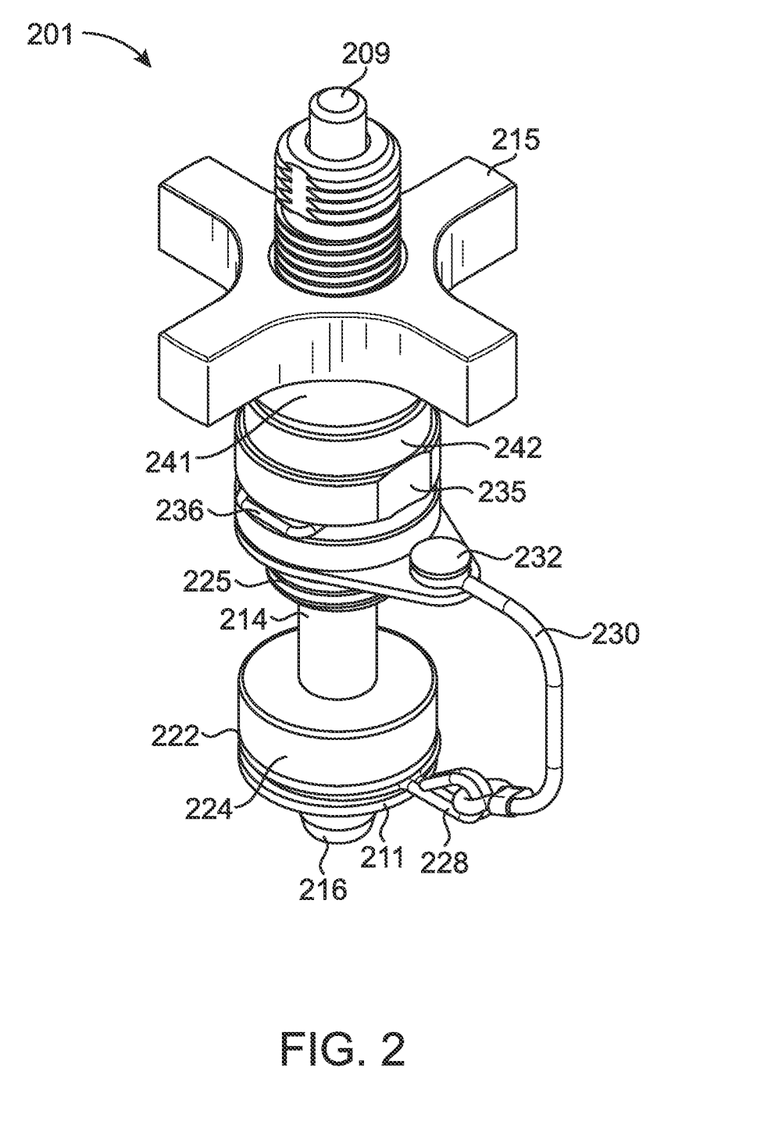
FIG. 2 depicts an isometric view of an embodiment of a ball-lock captive pin according to the present disclosure.
Figure 3:
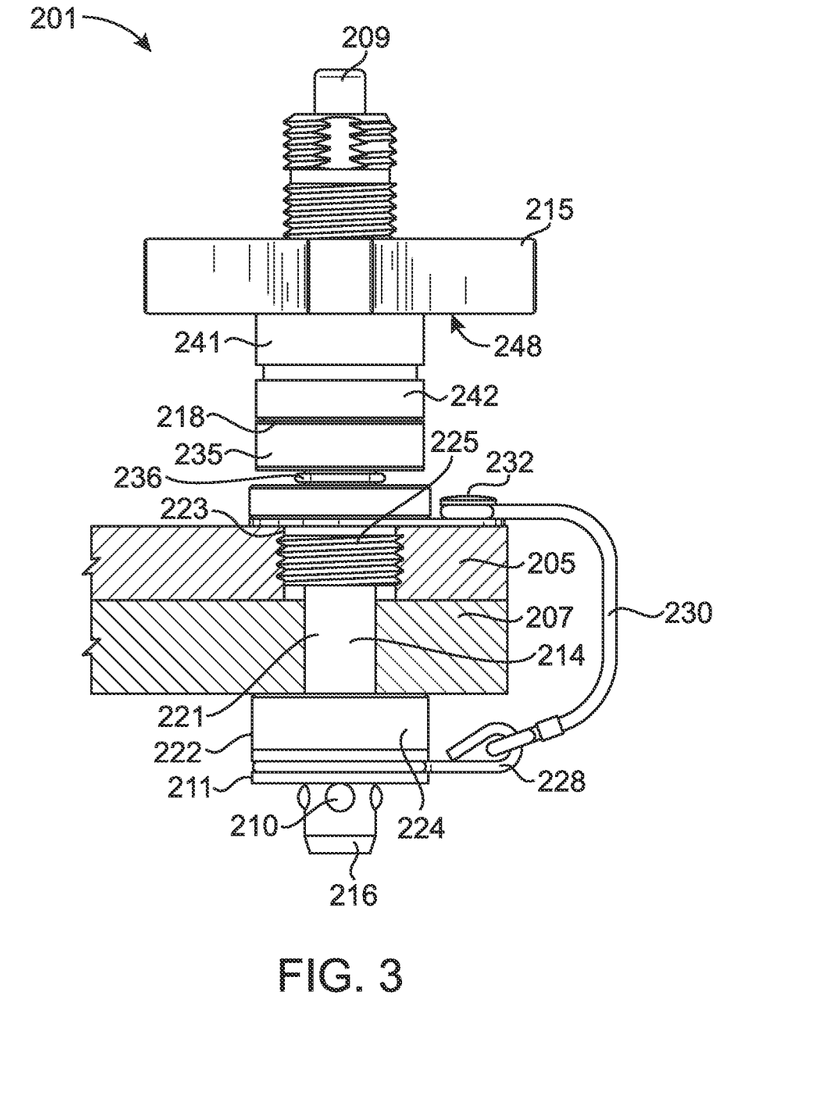
FIG. 3 depicts a side elevation view of an embodiment of a ball-lock captive pin according to the present disclosure with a cutaway view of the ball-lock captive pin installed on a workpiece and tool.

Described herein, among other things, is a quick-release captive clamping pin that uses a ball-lock pin and a clamping nut to provide a tooling assembly with clamping action and a quick-release captive pin. FIG. 2 provides an isometric view of an embodiment of an assembled quick-release captive pin assembly (201) according to the present disclosure, without a workpiece or tool. FIG. 3 provides a side elevation view of an embodiment of a quick-release captive pin assembly (201) according to the present disclosure installed in a cutaway view of a workpiece (207) and tool (205).

In the depicted embodiments, a workpiece (207) to be worked upon is disposed beneath a first tooling element (205). The workpiece (207) may be a movable element to be machined, a workbench, machining frame, or other element which an operator desires to hold in place during a machining operation. The workpiece (207) generally has a through bore (221), referred to herein as a workpiece bore (221) or workpiece bore (221). In the depicted embodiment, the workpiece bore (221) is a smooth-surfaced, cylindrical element disposed generally perpendicularly in the workpiece (207) with respect to the major plane of the workpiece (207). The radius of the depicted workpiece bore (221) is about the same, but slightly larger than, that of the ball-lock pin shaft (214). This radius should provide sufficient clearance for the ball-lock pin shaft (214) to pass through the workpiece bore (221) while remaining a snug fit with minimal lateral movement as commonly understood and used in the art.

Figure 4:
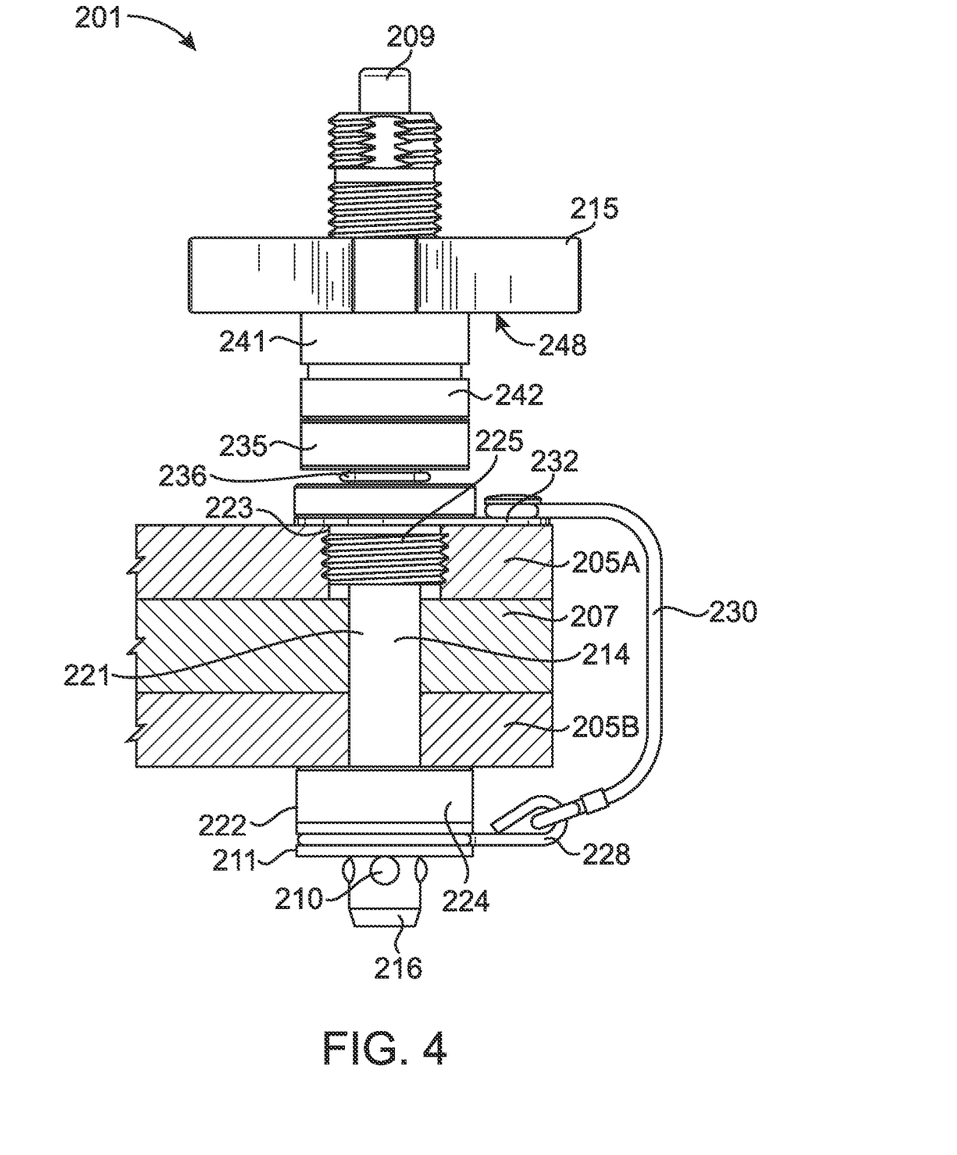
FIG. 4 depicts a side elevation view of an embodiment of a ball-lock captive pin according to the present disclosure with a cutaway view of the ball-lock captive pin installed on a workpiece and two tooling elements.

In the depicted embodiment, one or more tooling elements (205) are disposed adjacent to the workpiece (207). The depicted tooling element (205) is a top tooling element (205) but in an alternative embodiment, a bottom tooling element (207) may be used in addition to, or instead of, the top tooling element (205). FIG. 4 depicts an embodiment utilizing two tooling elements (205A) and (205B). The tooling element (205) also has a through bore (223), also referred to herein as the tool bore (223). The depicted through bore (223) comprises circumferential threading adapted or configured to receive a threaded element associated with the assembly (201), such as a bushing (235). In the depicted embodiment, the tool bore (223) is a generally cylindrical element disposed generally perpendicularly in the tool (205) with respect to the major plane of the tool (207). The radius of the depicted tool bore (223) is larger than that of the depicted workpiece bore (221) but in any case is sufficient for the ball-lock pin shaft (214) to pass through. When installed, the workpiece bore (223) and tool bore (221) are generally coaxially aligned.

In the depicted embodiments of FIGS. 1-4, the workpiece (207) and tool (205) are clamped together using an adjustable captive ball-lock pin (209) and a ball-lock retaining element (211). Examples of adjustable ball-lock pins (209) are known in the art, and an exemplary embodiment of such a pin (209) is shown and described in U.S. Pat. No. 3,101,641, granted Aug. 27, 1963, the entire disclosure of which is incorporated herein by reference.

Figure 7:
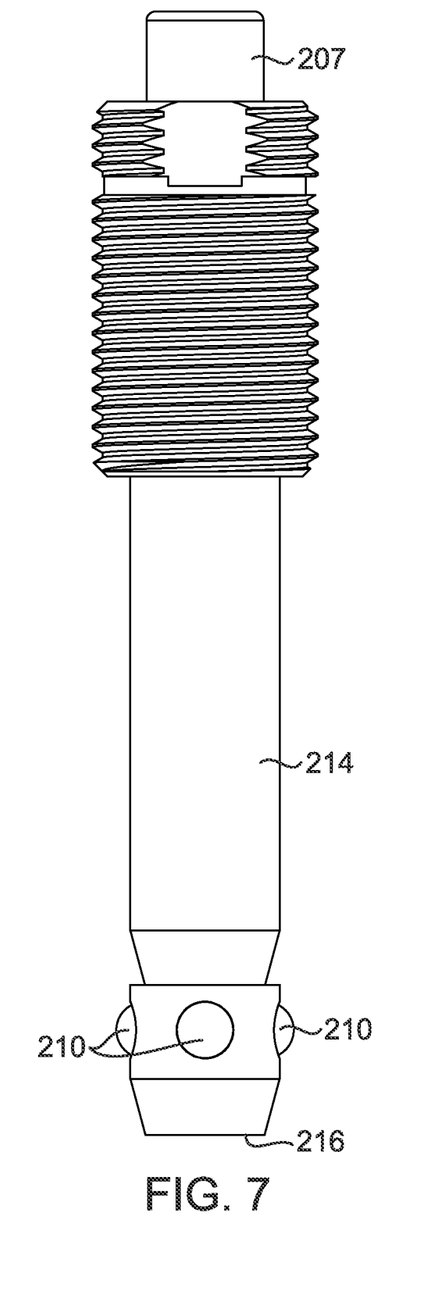
FIG. 7 depicts a side elevation view of a captive ball-lock pin according to the present disclosure.
Figure 8:
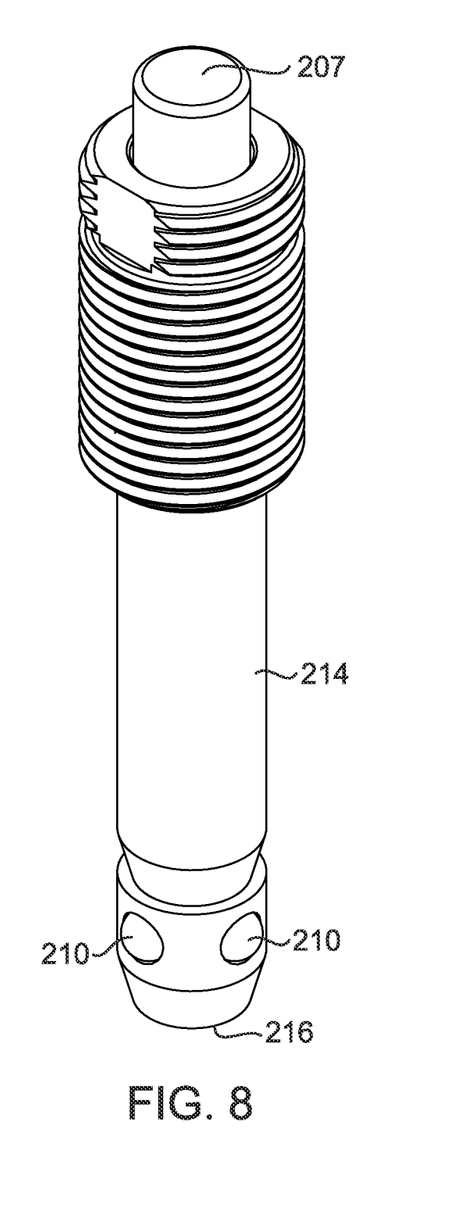
FIG. 8 depicts an isometric view of the captive ball-lock pin of FIG. 7.

The depicted captive ball-lock pin (209) comprises a shaft (214) in the configuration of generally cylindrical hollow tube element. An embodiment of the captive ball-lock pin shaft is depicted in FIGS. 7 and 8. At the distal end (216) of the shaft (214), a plurality of apertures are disposed. Each aperture has is sized and shaped to partially retain a small ball (210). The balls (210) are sized and shaped such that they can partially project through the apertures, but cannot fully pass through the apertures. When partially projecting through the apertures on opposing sides of the shaft (214), the distance from the outer edge of one ball (210) to the axial center of the pin (209), referred to herein as the "deployed radius" of the pin (209), is greater than the radius of the shaft (214). Thus, the ball-lock pin (209) can be held in place by the retaining element (211), which has a through bore with a diameter slightly larger than that of the shaft (214) but smaller than the deployed diameter of the pin (209). To install the captive ball-lock pin (209), the balls (210) are retracted, the distal end (216) is inserted through the retaining element (211) bore, and then the balls are projected on the distal (or bottom, in the depicted embodiment) side of the retaining element (211). Because the balls can be firmly held in place in projected position, the captive pin (209) cannot be retracted back through the retaining element (211). Structures and methods of operation for deploying and retracting the balls are show in, for example, the aforementioned U.S. Pat. No. 3,101,641. In the depicted embodiment, the balls (210) are projected and retracted by use of a plunger element glidingly disposed in the hollow tubular shaft (214). The plunger is operable to a first position in which it cause the balls (210) to project, and to a second position in which the balls (210) recede.

Thus, as shown in, for example, the depicted embodiment of FIG. 3, the captive ball-lock pin (209) is installed by inserting the distal end (216) of the pin (209) through the tool bore (223), workpiece bore (221), and retaining element (211). The balls (210) are retracted as needed to pass through the bores and then projected once the apertures are disposed on the opposing or distal side of the retaining element (211). This configuration provides retaining force that inhibits the pin (209) from retracting from the assembly.

However, in some circumstances it may be desirable to apply further clamping force. In an embodiment, this may be done by utilizing the adjustability features of the ball-lock pin (209). By way of example and not limitation, the ball-lock pin (209) may have an adjustable length, which is configurable by the operator manipulating a handle assembly (241) The depicted handle assembly (241) comprises a grip (215) affixed to a body element (242). Applying twisting force shortens or lengthens the pin (209). When shortened, this has the effect of reducing the distance between the bottom (218) or abutting face (218) of the handle assembly (241) and any other elements of the assembly (201). Once the abutting face (218) is adjacent to any other elements disposed between the abutting face (218) and the tool (205), further adjustment of the handle assembly (241) to shorten the pin (209) effectively applies increasing clamping force to the assembly (201). Structures and methods of operation for an adjustable handle assembly (215) as described herein are show in, for example, the aforementioned U.S. Pat. No. 3,101,641.

In the depicted embodiment, the retaining element (211) may be included in an endcap assembly (222). In the depicted embodiment, the endcap assembly (222) comprises a non-marking or non-marring element (224) disposed above the retaining element (211) (i.e., adjacent to a surface of the workpiece (207)). The depicted non-marking element (224) comprises a through bore of similar radius to that of the retaining element (211), through which the distal end (216) of the shaft (214) passes during installation. The depicted non-marking element (224) is a generally cylindrical element (224) with a flat top surface abutting the workpiece (207). The side abutting the workpiece (207) comprises a non-marking, non-marring surface to prevent damage to or scratching of the workpiece (207) during installation and machining.

In the depicted embodiment, the endcap assembly (222) further comprises an attaching element (228) for attaching a lanyard (230). The lanyard (230) holds the endcap assembly (222) and pin (209) together so they do not become inadvertently separated or lost. In the depicted embodiment, the attaching element (228) is a hook or loop protruding laterally or radially from the endcap element (222) and is disposed between the retaining element (211) and non-marking element (224). This configuration is preferred so that the connecting element (228) does not interfere with the retention function nor pose a risk of damaging the workpiece (207). In the depicted embodiment, the pin (209) also comprises a pin connecting element (232), and a lanyard (230) is connected to each. The lanyard (230) is preferably pivotably or rotatably connected on at least one of the two attaching elements (228) and (232) for greater installation flexibility and less risk of stress or damage to the lanyard (230). A shown in FIG. 3, the connecting elements (228) and (232) may be part of a flat ring or other annular element installed coaxially in the endcap assembly (222) or pin (209), respectively, as shown.

In an embodiment, the assembly (201) may further comprise a bushing assembly (235). A bushing assembly (235) is generally a sleeve (usually of metal) inserted into a bore to protect the interior surface of the bore and provide a seating for a pin, dowel, or other object to be inserted therein. The bushing assembly (235) generally comprises a sleeve attached to a bushing head and may further comprise a locking means (236), such as a locking pin for holding the inserted pin or object in place. An exemplary embodiment of a bushing assembly (235) for use with a captive locating screw is shown and described in U.S. Pat. No. 10,393,159, issued Aug. 27, 2019, the entire disclosure of which is incorporated herein by reference, including (but not limited to) with respect to FIG. 3 thereof. This, or a similar, bushing assembly (235) may be used, alone, or with a captive locating screw as shown and described therein.

Generally, the bushing assembly (235) is received into the tool bore (223) and seated therein, and the ball-lock pin (209) is then inserted through the seated bushing assembly (235). It should be noted that a washer as disclosed in U.S. Pat. No. 10,393,159 may be omitted in this usage, because the washer is a floating element to facilitate rotation of the handle assembly (241), but in this case, the handle assembly (241) is rotated for purposes of shortening the pin (209), not screwing the captive screw assembly to a receiver.

Figure 5:
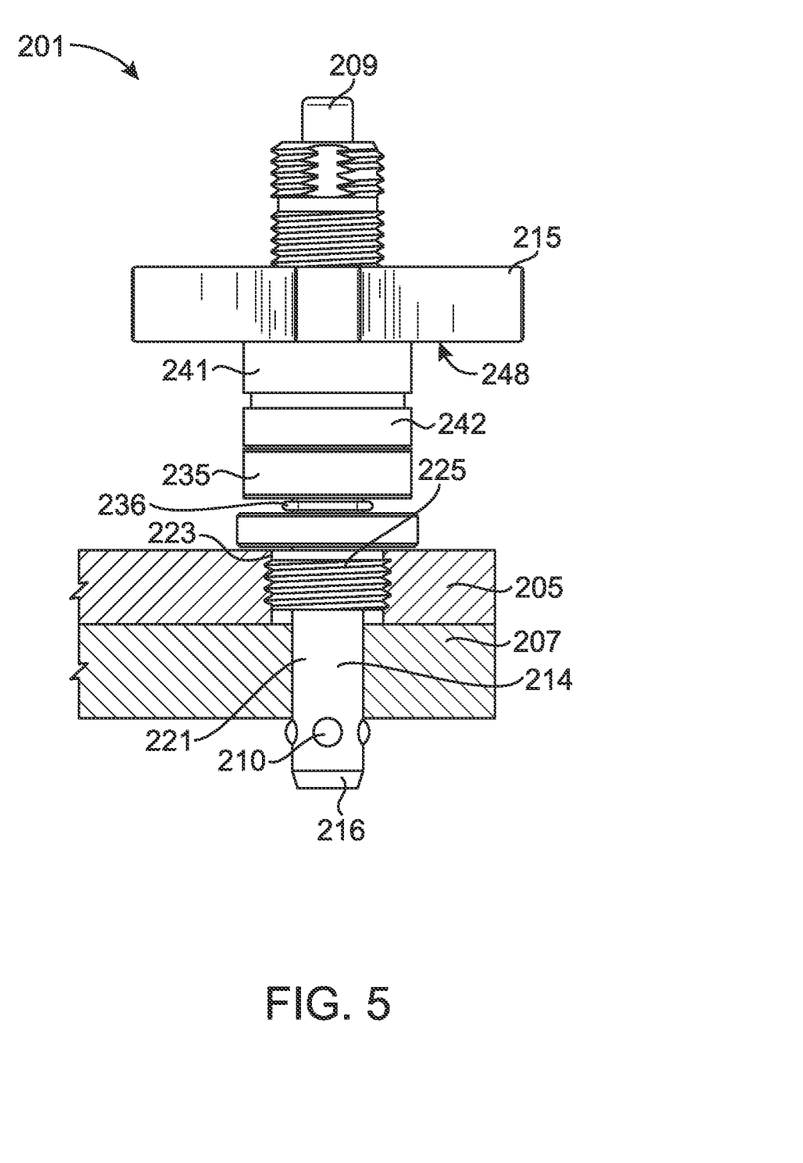
FIG. 5 depicts a side elevation view of an embodiment of a ball-lock captive pin according to the present disclosure with a cutaway view of the ball-lock captive pin installed on a workpiece without an endcap assembly.
Figure 6:
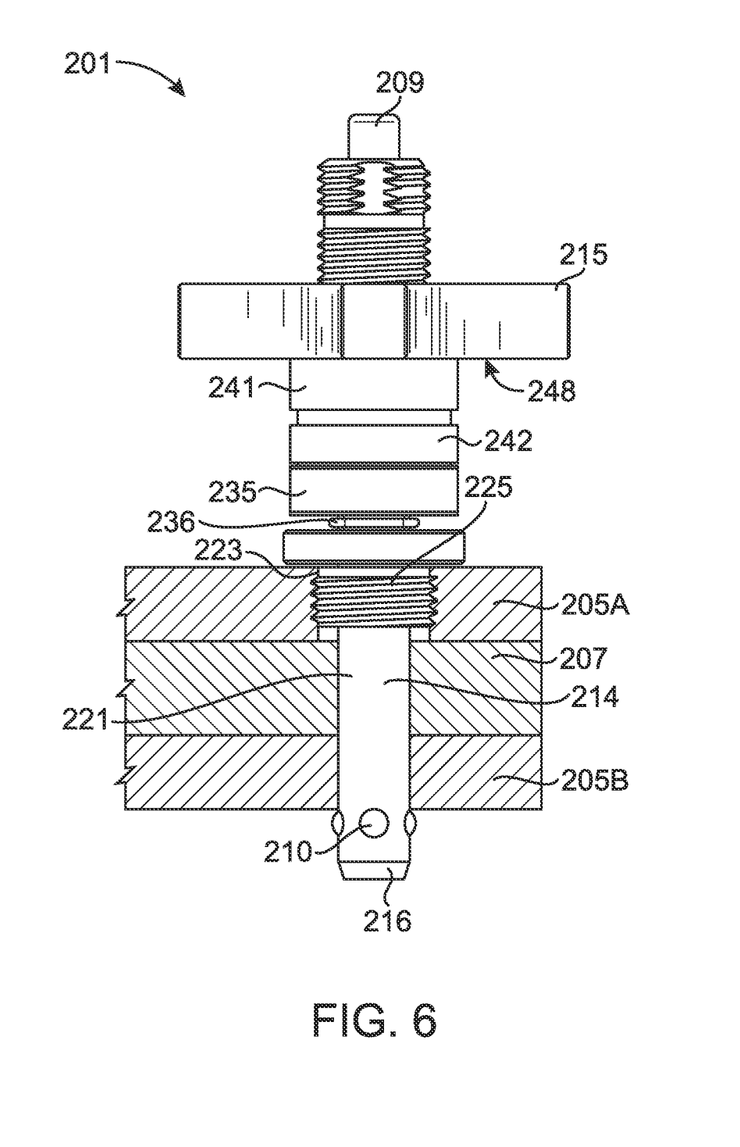
FIG. 6 depicts a side elevation view of an embodiment of a ball-lock captive pin according to the present disclosure with a cutaway view of the ball-lock captive pin installed on a workpiece and two tooling elements and without an endcap assembly.

In an embodiment, the endcap element (222) may be omitted, and the opposing surface of the workpiece (207) or bottom tool element (205) could provide the retaining element (211). In such an embodiment, the workpiece bore (221) or bottom tool bore (223B), as the case may be, has a radius sized and shaped to be slightly larger than that of the shaft (214) but smaller than that of the deployed dimension of the pin (209). In this configuration, the endcap assembly (222) could be omitted entirely. However, this configuration risks scratching or damage of the workpiece (207) or bottom tool (205) by bearing the force of the balls (210). FIG. 5 depicts an embodiment (201) utilizing a single tooling element (205) without an endcap assembly. FIG. 6 depicts an embodiment utilizing two tooling elements (205A) and (205B) without an endcap assembly.

Throughout this disclosure, geometric terms may be used to characterize, among other things, sizes, shapes, dimensions, angles, distances, and relationships. These terms may be used with qualifiers such as "generally," "about," and "approximately." One of ordinary skill in the art will understand that, in the context of this disclosure, these terms are used to describe a recognizable attempt to conform a device or component to the qualified term. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar. Variations from geometric descriptions are unavoidable due to, among other things, manufacturing tolerances resulting in shape variations, defects, imperfections, non-uniform thermal expansion, natural wear, minor variations that are nevertheless recognizable as the qualified term, and other deformations. One of ordinary skill in the art will understand how to apply geometric terms, whether or not qualified by relative terms such as "generally," "about," and "approximately," to describe a reasonable range of variations from the literal geometric term in view of these and other considerations appropriate to the context. Additionally, the use of the conjunctive and disjunctive should not necessarily be construed as limiting, and the conjunctive may include the disjunctive, and vice versa.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A captive clamping system comprising a captive clamping pin assembly, the captive clamping pin assembly comprising:

a tubular shaft having a plurality of ball apertures at a first end thereof, each of said ball apertures having a ball disposed therein;

a plunger slidingly received in said tubular shaft;

a handle assembly disposed at a second end opposing said first end; and a distance-adjusting means for adjusting a distance between said handle assembly and said first end by rotating said handle assembly;

wherein said plunger is operable to a first position in which said plunger causes said balls to project through said plurality of apertures a distance greater than the outer radius of said shaft; and wherein said plunger is operable to a second position in which said balls recede inward of said outer radius; and a generally cylindrical endcap assembly having a first side proximal said handle assembly and an opposing second side, and a bore extending generally coaxially therethrough;

wherein when said captive clamping pin assembly is disposed on a workpiece, said plurality of apertures are disposed beyond said second side.

2. The captive clamping system of claim 1, further comprising said workpiece, said workpiece comprising a workpiece bore.

3. The captive clamping system of claim 2 further comprising a machine tool comprising a tool bore.

4. The captive clamping system of claim 3, wherein said machine tool is positioned on a first side of said workpiece such that said tool bore and said workpiece bore are generally coaxially aligned.

5. The captive clamping system of claim 4, wherein said endcap assembly is disposed on a second side of said workpiece opposing said workpiece first side such that said tool bore, said workpiece bore, and said endcap assembly bore are generally coaxially aligned.

6. The captive clamping system of claim 5, further comprising a second machine tool comprising a second tool bore.

7. The captive clamping system of claim 6, wherein said second machine tool is disposed on said second side of said workpiece such that a first side of said second machine tool is adjacent said workpiece second side and said endcap assembly is adjacent a second side of said second machine tool opposing said first side.

8. The captive clamping system of claim 7, wherein said endcap assembly further comprises a lanyard pivotably attached to said endcap assembly.

9. The captive clamping system of claim 8, wherein said lanyard is pivotably attached to said adjustable-length ball-lock pin.

* * * * *

UNITED STATES PATENT AND TRADEMARK OFFICE
CERTIFICATE OF CORRECTION

PATENT NO. : 11,919,133 B2
APPLICATION NO. : 17/860398
DATED : March 5, 2024
INVENTOR(S) : Colin Walker Frost et al.

It is certified that error appears in the above-identified patent and that said Letters Patent is hereby corrected as shown below:

In the Claims

Column 8, Claim 1, Line 1 should add: -- an adjustable-length ball-lock pin comprising: --.

Signed and Sealed this
Seventh Day of May, 2024

Katherine Kelly Vidal
*Director of the United States Patent and Trademark Office*